(12) United States Patent
Shimizu et al.

(10) Patent No.: US 11,958,428 B2
(45) Date of Patent: Apr. 16, 2024

(54) AIRBAG DEVICE AND VEHICLE SEAT

(71) Applicant: Autoliv Development AB, Vargarda (SE)

(72) Inventors: Takayuki Shimizu, Kanagawa (JP); Atsushi Nakashima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 109 days.

(21) Appl. No.: 17/754,500

(22) PCT Filed: Sep. 2, 2020

(86) PCT No.: PCT/JP2020/033193
§ 371 (c)(1),
(2) Date: Apr. 4, 2022

(87) PCT Pub. No.: WO2021/065304
PCT Pub. Date: Apr. 8, 2021

(65) Prior Publication Data
US 2023/0242061 A1 Aug. 3, 2023

(30) Foreign Application Priority Data
Oct. 4, 2019 (JP) .................................. 2019-184008

(51) Int. Cl.
*B60R 21/207* (2006.01)
*B60R 21/215* (2011.01)
(Continued)

(52) U.S. Cl.
CPC .......... *B60R 21/207* (2013.01); *B60R 21/215* (2013.01); *B60R 21/231* (2013.01); *B60R 21/237* (2013.01)

(58) Field of Classification Search
CPC . B60R 21/201; B60R 21/207; B60R 21/2015; B60R 21/231; B60R 21/237; B60N 2002/5808
See application file for complete search history.

(56) References Cited

U.S. PATENT DOCUMENTS 7,004,496 B2 *  2/2006  Bossecker ............. B60R 21/207
                                                           280/730.2
7,318,601 B2 *  1/2008  Sugimoto ............. B60R 21/233
                                                           297/216.12
(Continued)

FOREIGN PATENT DOCUMENTS

EP      3581441 A1    12/2019
JP   2004-276906 A    10/2004
(Continued)

OTHER PUBLICATIONS

KR20110086416A Machine English translation (Year: 2010).*
(Continued)

*Primary Examiner* — Jason D Shanske
*Assistant Examiner* — Matthew James O'Neill
(74) *Attorney, Agent, or Firm* — Harness, Dickey & Pierce, P.L.C.; Stephen T. Olson

(57) ABSTRACT

The present invention is an airbag device equipped in a vehicle seat having a seat cushion forming a seat surface and a seatback forming a backrest, containing: an inflator; and an airbag that is stowed in the seatback and deployed by the expansion gas discharged from the inflator. The airbag includes a pair of left and right side chambers that deploy from the side parts of the seatback forward and an upper chamber that is provided continuously with the side chambers and deploys above the head of the occupant. The airbag, from a state of being spread out before stowing, is rolled or folded and compressed in a long rod shape in a direction intersecting a longitudinal direction. The location corre- (Continued)

sponding to the upper chamber of the long rod-shaped airbag is stowed in a stowing part at the rear surface of the headrest at the upper part of the seatback.

19 Claims, 13 Drawing Sheets

(51) Int. Cl.
*B60R 21/231* (2011.01)
*B60R 21/237* (2006.01)

(56) References Cited

U.S. PATENT DOCUMENTS 7,703,800 B2 * 4/2010 Gutmann .............. B60R 21/207
280/730.2
2016/0121839 A1 * 5/2016 Ko ........................ B60R 21/233
280/730.1
2017/0028955 A1 * 2/2017 Ohno .................... B60R 21/233
2017/0282834 A1 10/2017 Sugie et al.

FOREIGN PATENT DOCUMENTS

| JP | 2010-221736 | A |   | 10/2010 |
|----|-------------|---|---|---------|
| JP | 2011-25818  | A |   | 2/2011  |
| JP | 2017-202769 | A |   | 11/2017 |
| JP | 2019-18593  | A |   | 2/2019  |
| KR | 20110086416 | A | * | 1/2010  |
| WO | 2018/114723 | A1|   | 6/2018  |

OTHER PUBLICATIONS

Office Action received in corresponding Chinese Patent Application 202080063633.0, dated Mar. 29, 2023 with translation.

* cited by examiner

[FIG. 1]
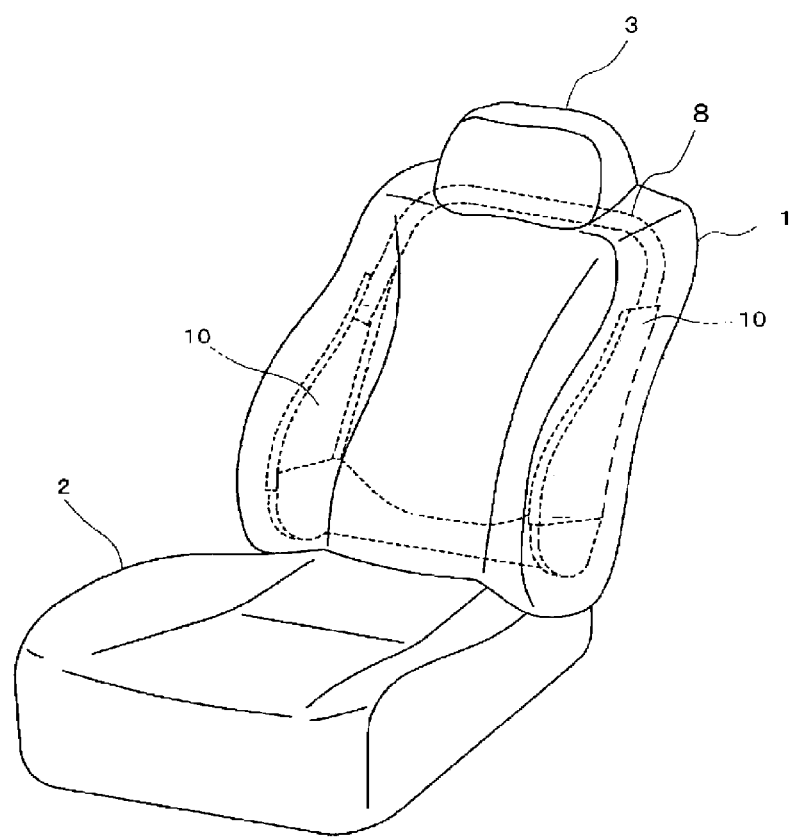

[FIG. 2]
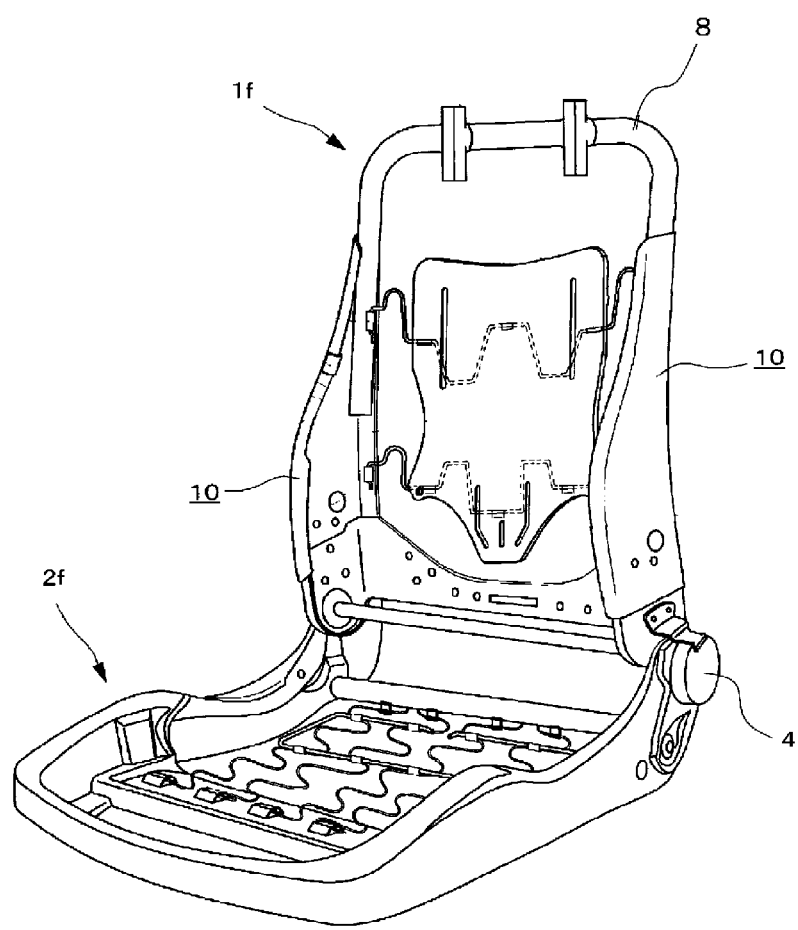

[FIG. 3]
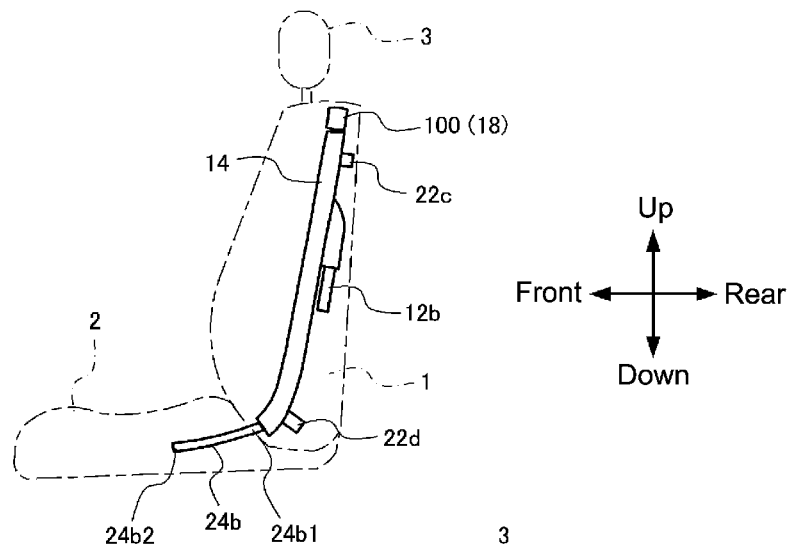
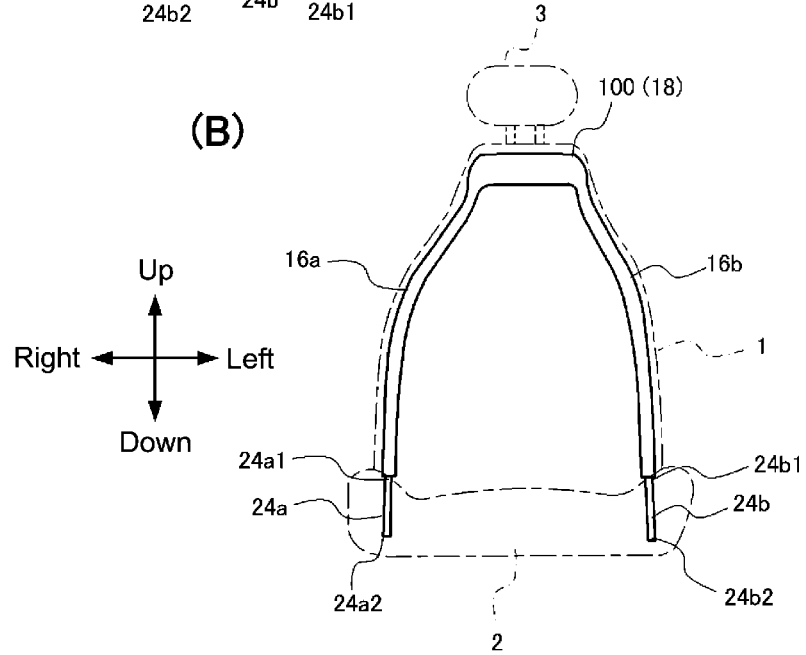

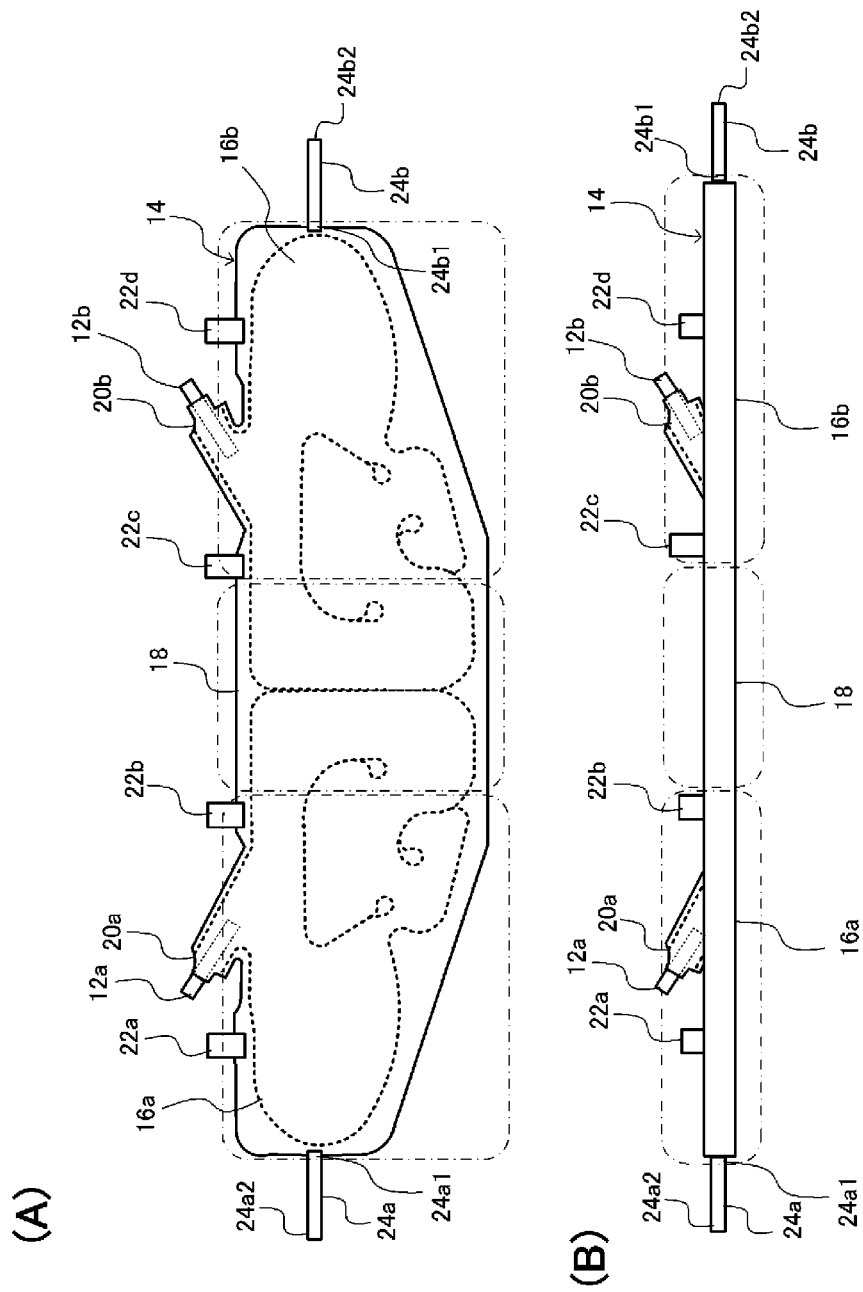
[FIG. 4]

[FIG. 5]
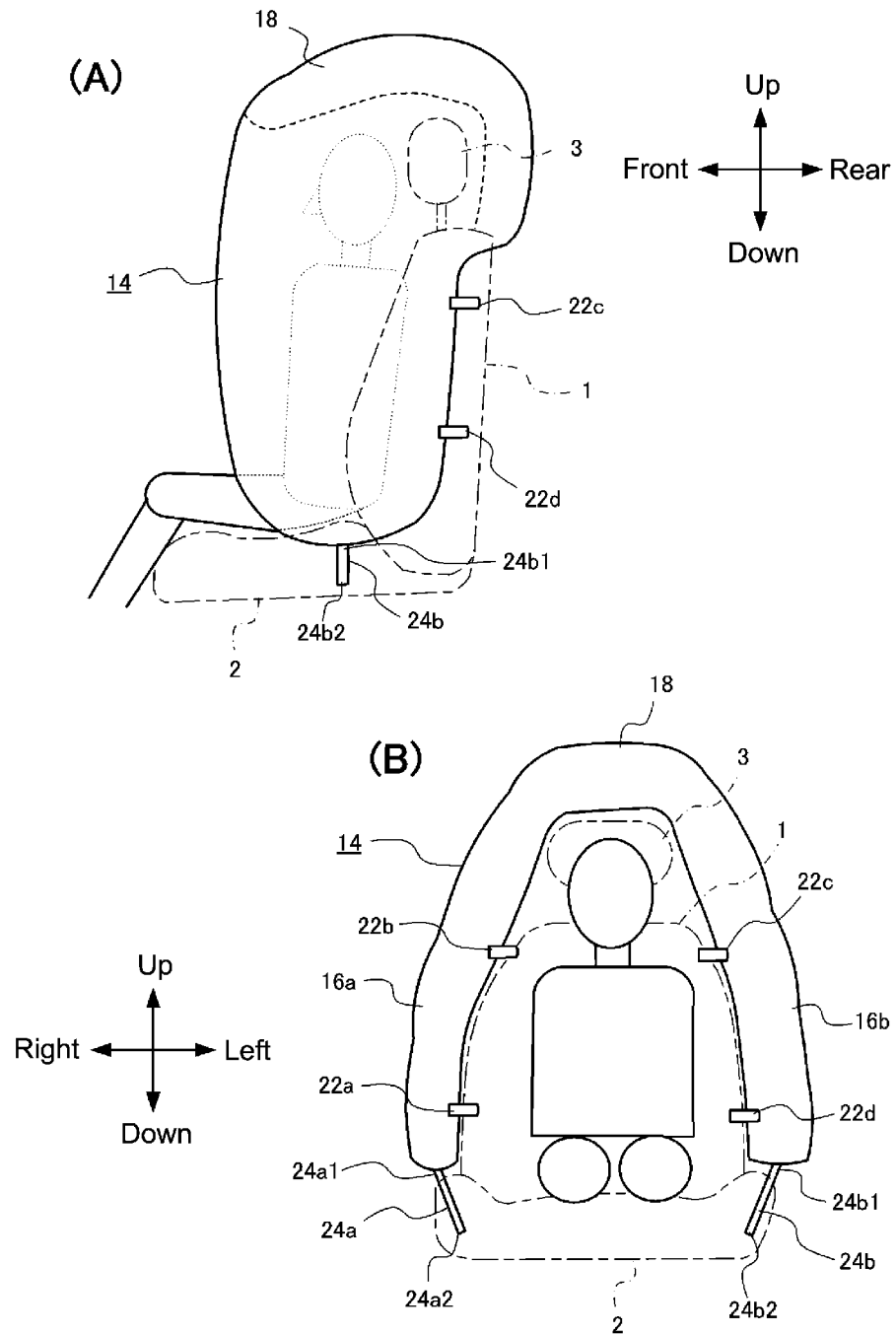

[FIG. 6]
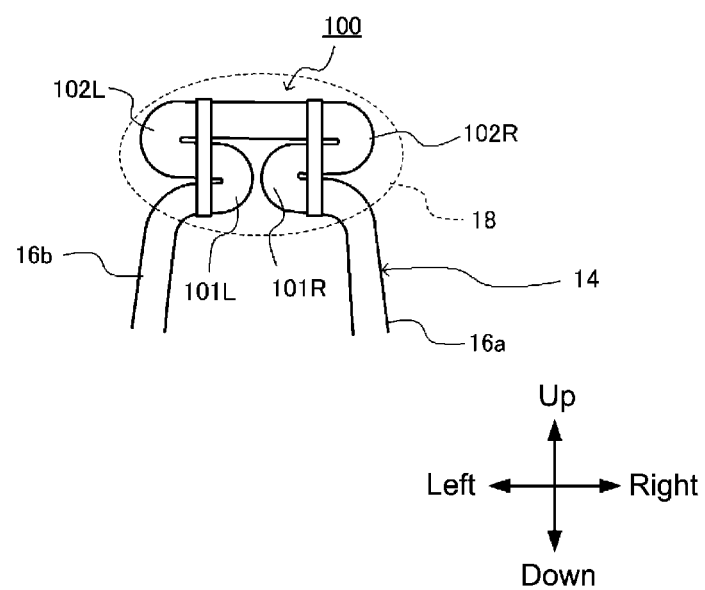

[FIG. 7]
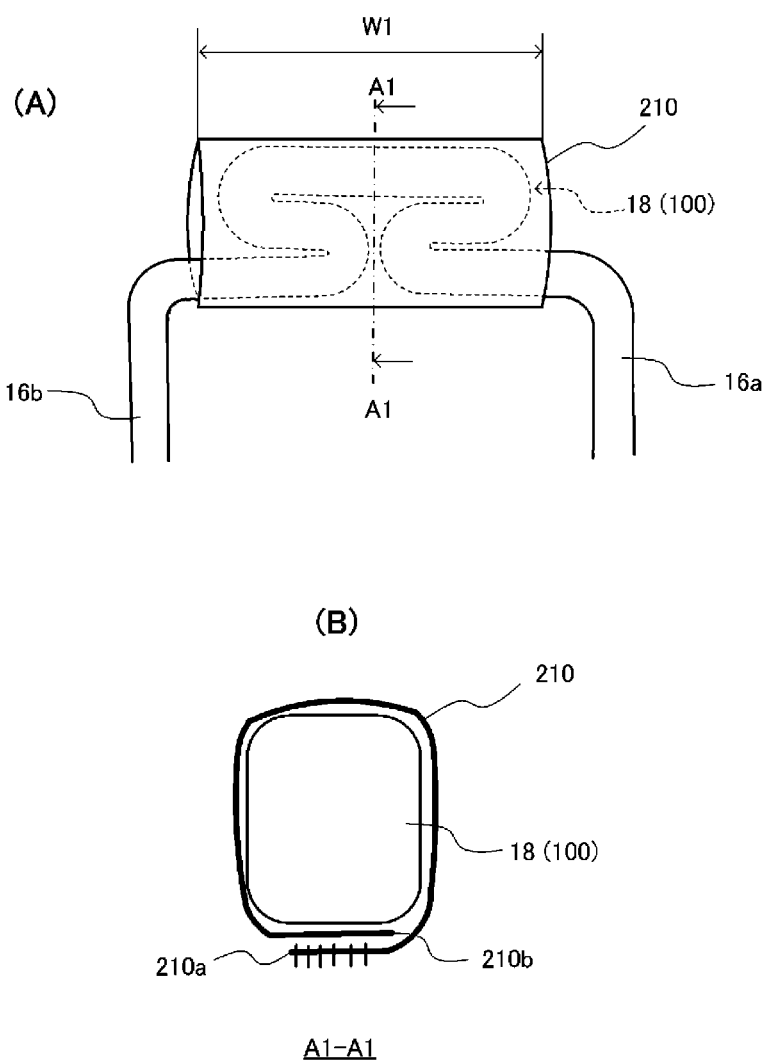

[FIG. 8]
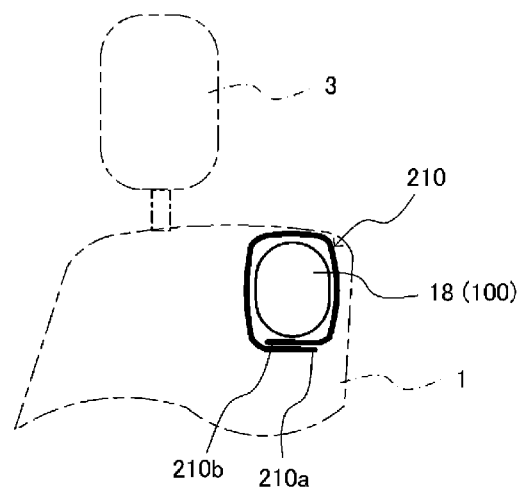
(A)
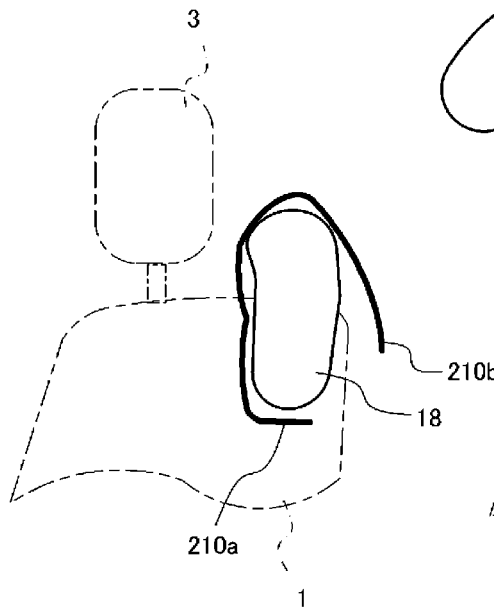
(B)
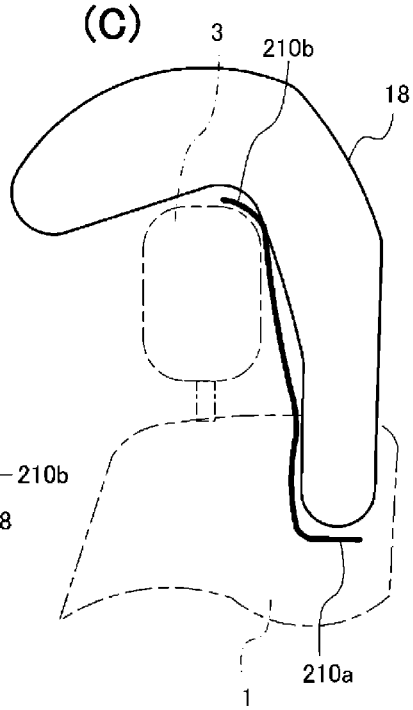
(C)

[FIG. 9]
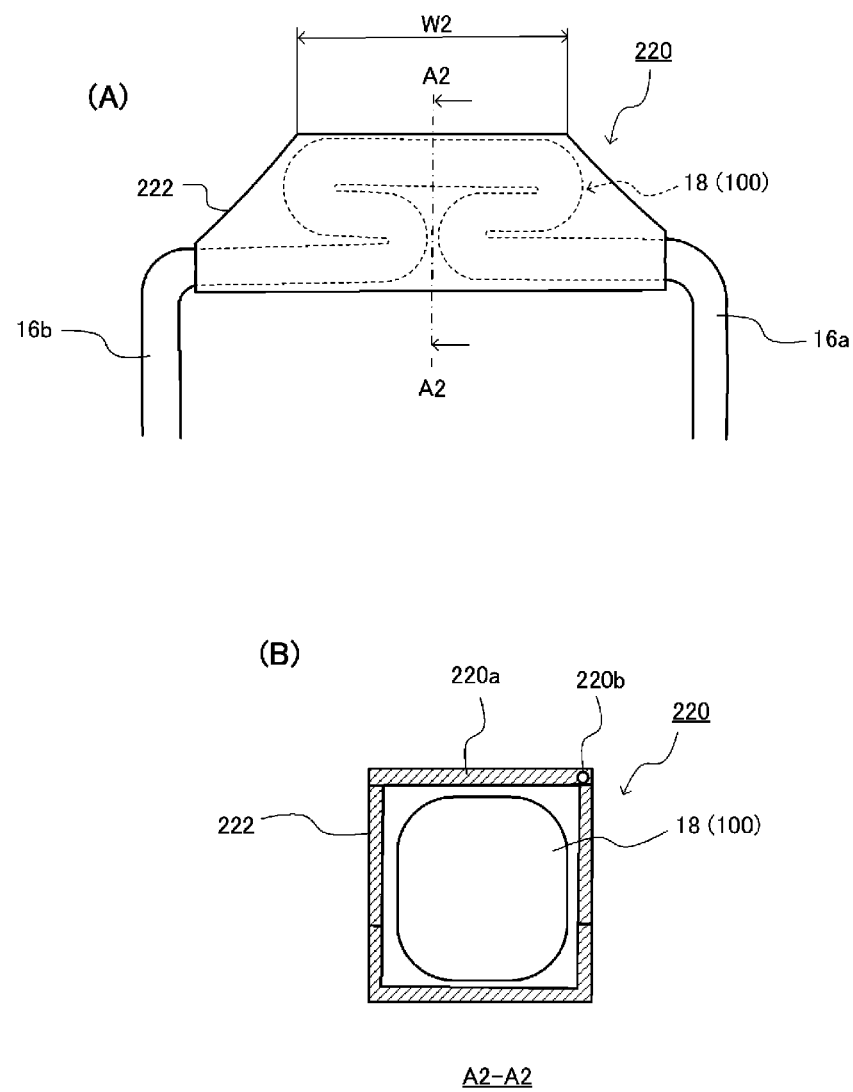

[FIG. 10]
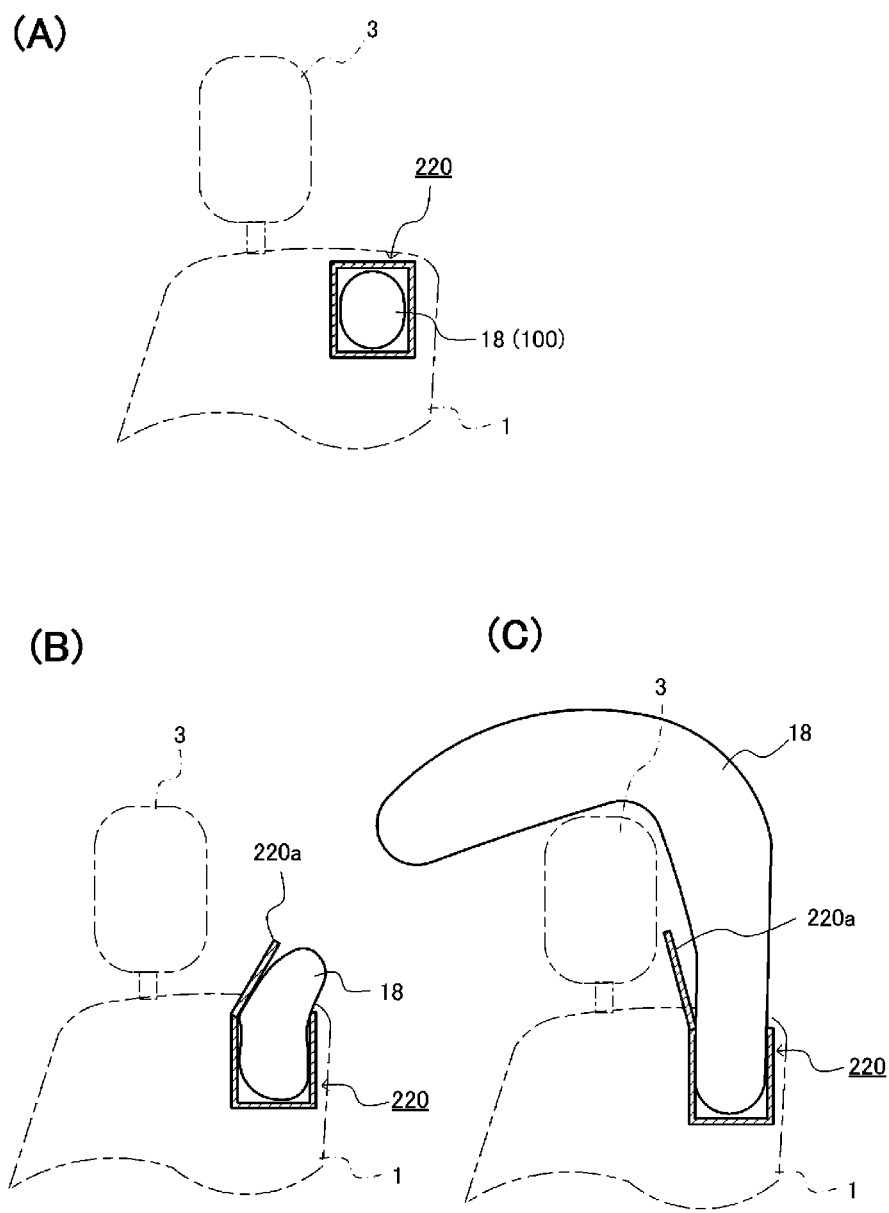

[FIG. 11]
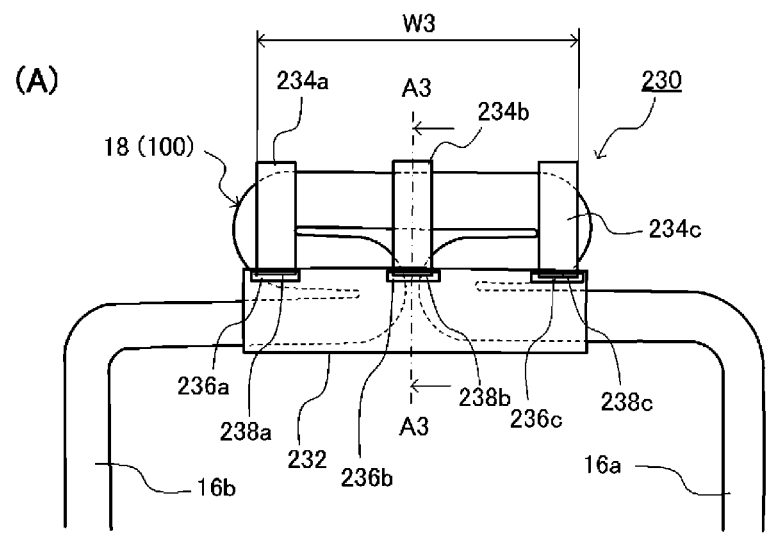
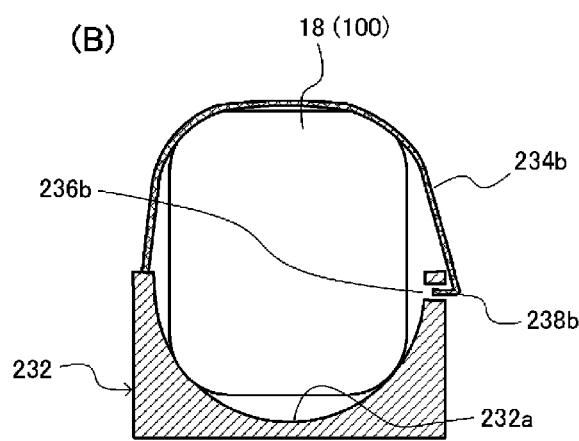
A3-A3

[FIG. 12]
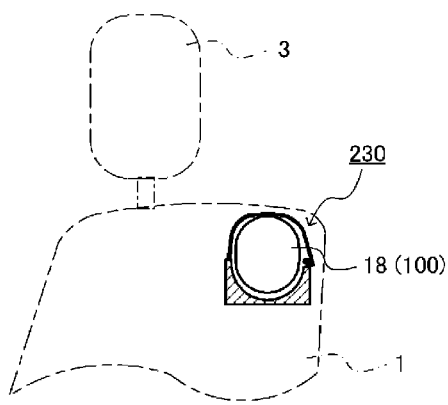
(A)
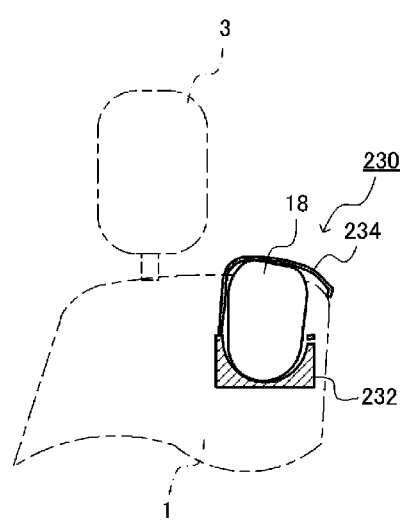
(B)
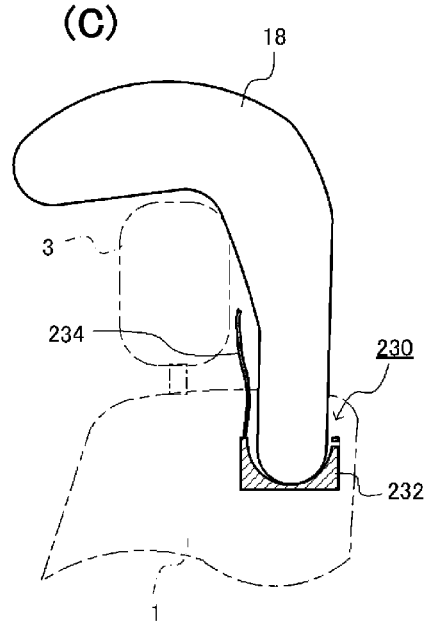
(C)

[FIG. 13]
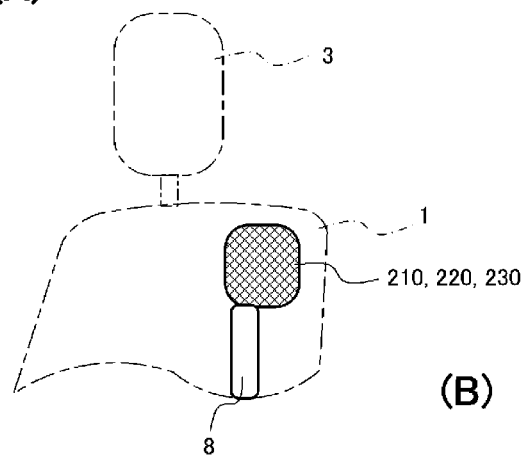
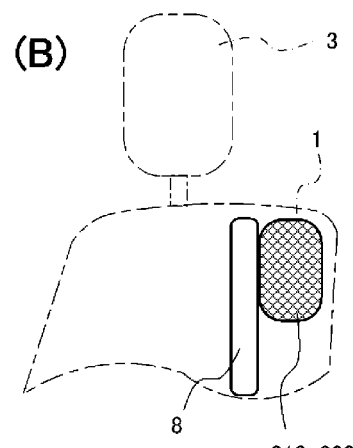
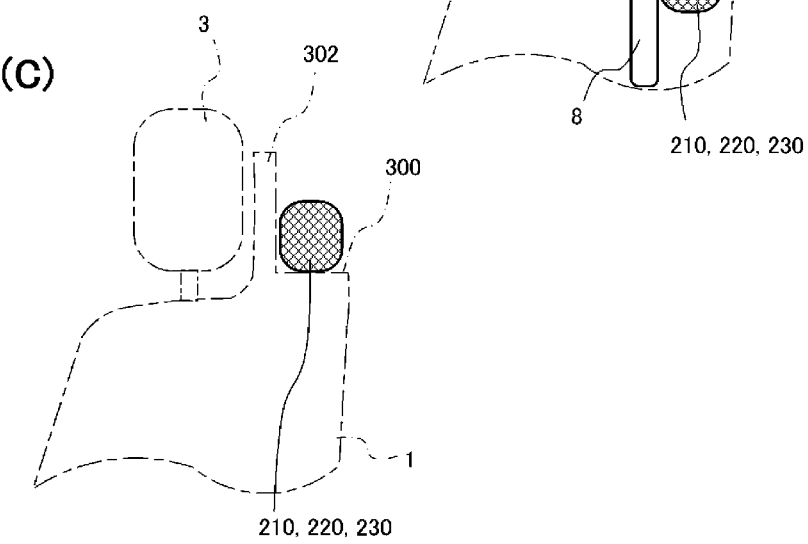

11,958,428 B2

AIRBAG DEVICE AND VEHICLE SEAT

TECHNICAL FIELD

The present invention relates to an airbag device equipped in a vehicle seat. In particular, the present invention relates to an airbag device that can reliably restrain the occupant in question regardless of the posture of the occupant seated in the seat.

BACKGROUND TECHNOLOGY

The provision of a vehicle with one or more airbags in order to protect the occupants thereof in the event of a vehicle accident is well known. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the occupant upon impact in the transverse direction of a vehicle.

In recent years, with the advancement of automatic vehicle driving technology, occupants are anticipated to adopt various seating postures, such as a relaxed posture with the seat largely reclined, and such occupants need to be properly protected in such situations.

However, the well-known side airbag system installed in vehicle seats deploys airbags from one or both sides of the seat, making it difficult to adequately protect occupants in various postures.

SUMMARY OF THE INVENTION

Problem to be Solved by the Invention

The present invention has been created in view of the abovementioned problems, an object thereof is to provide an airbag device that may reliably restrain the occupant regardless of the posture of the occupant seated in the seat.

Means for Solving the Problems

The following describes means for solving the abovementioned problem and the effect thereof. In the present invention, when an occupant is seated in a seat in a regular posture, the direction the occupant faces is referred to as the "front," the opposite direction is referred to as the "rear," and the direction indicating the coordinate axis is referred to as the "front-to-back direction." Moreover, when the occupant is seated in the seat in a regular posture, the right of the occupant is referred to as "right direction," the left of the occupant is referred to as "left direction," and the direction indicating the coordinate axis is referred to as the "left-right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

To achieve the object described above, the present invention is an airbag device equipped in a vehicle seat having a seat cushion forming a seat surface and a seatback forming a backrest, containing:

an inflator that generates an expansion gas; and
an airbag that is stowed in the seatback and is deployed by the expansion gas discharged from the inflator. The airbag includes a pair of left and right side chambers that deploy from the side parts of the seatback forward and an upper chamber that is provided continuously with the side chambers and deploys above the head of the occupant. In addition, the airbag, from a state of being spread out prior to stowing, is rolled or folded and compressed in a long rod shape in a direction intersecting a longitudinal direction. Furthermore, the location corresponding to the upper chamber of the long rod shaped airbag is stowed in a stowing part provided at the rear surface of the headrest at the upper part of the seatback.

Note, the left-right pair of side chambers do not necessarily have to be formed with left-right symmetry and can be formed with asymmetry.

With the present invention, including the left-right pair of side chambers that deploy from the sides of the seatback forward and an upper chamber that deploys above the head of the occupant causes the airbag to deploy in a dome shape, providing total coverage from the side part to the upper part of the occupant sitting in the seat. As a result, the airbag can reliably restrain movement of the occupant at least in the left-right direction, upward, and diagonally upward, and provide suitable protection from the head to the waist of the occupant.

In addition, by stowing the location corresponding to the upper chamber of the long rod-shaped airbag in the stowing part provided on the rear surface of the headrest above the seatback, the upper chamber reliably deploys close to the head of the passenger when the airbag is deployed.

The airbag device, wherein the airbag device preferably further includes:

a cover member that deploys toward a rear surface of the headrest in conjunction with deployment of the airbag, wherein the cover member covers at least the boundary part of the seatback and the headrest.

The cover member covers the boundary part between the seatback and headrest when the airbag deploys and this enables avoiding the issue of the upper chamber of the airbag entering or being trapped in the gap between the seatback and the headrest that would hinder deployment of the upper chamber. This manner of advantage is in particular effective in the case the vehicle seat is a type where the headrest is adjustable in the vertical direction.

Additionally, by deploying (extending) the cover member on the rear surface of the headrest, the deployment direction of the upper chamber of the airbag is guided in the correct direction, the deployment behavior can be stabilized, and an effect of mitigating impact on the rear surface of the headrest caused by airbag deployment pressure can be anticipated.

The upper end of a deployed cover member preferably reaches the upper end of a headrest set to the highest position thereof.

By extending the cover member to the upper end of the headrest, unevenness impeding smoothness of the upper chamber of the airbag can be removed enabling stabilizing of deployment behavior of the airbag and exhibiting the function of the cover member of mitigating and the like of the impact on the headrest to a maximum degree.

The lateral width of the cover member can be set to equal or greater than the width of the headrest.

By setting the width of the cover member to be equal to or greater than the width of the headrest, the rear surface of the headrest can be completely covered by the cover member.

The cover member can be a flexible flap that envelops the area corresponding to the upper chamber of the airbag, where a first end of this flap is secured and a second end extends towards the upper part of the rear surface of the headrest in conjunction with deployment of the airbag.

By employing a flexible flap that envelops the upper chamber as a first aspect of the stowing part, the space required for the stowing part can be minimized, and the part corresponding to the upper chamber can be stowed relatively compact. Additionally, by changing the length of the flap, the range in the vertical direction (height direction) that can be covered by the cover member can be easily adjusted.

A configuration where the stowing part includes a rigid housing for stowing the location corresponding to the upper chamber of the airbag, and the housing is secured to the seat frame arranged in the seatback is feasible. Here, a configuration with a lid that can be opened and closed provided on the upper part of the housing where the lid functions as a cover member and opens when the airbag is deployed is preferable.

In a second aspect of the stowing part, a rigid housing that can be molded from metal or plastic is used where the lid functioning as a cover member enables effective mitigation of the upper chamber impacting the rear surface of the headrest when the airbag is deployed. In addition, configuring of the cover member as the simple operation of opening and closing of the lid more reliably enables the function of the cover member.

A configuration of the stowing part can include a base part with a recessed part enabling retaining the location corresponding to the upper chamber of the airbag, where the base part is secured to the seat frame arranged in the seatback.

Here, the configuration of the base part is preferably provided with a plurality of strip members that cover the upper part of the location corresponding to the upper chamber of the airbag, where a first end of the strip members is secured to the base part and a second end engages with the base part by means of a hook, and upon deployment of the airbag, the hook of the strip members disengage and the strip members function as a cover member.

As a third aspect of the stowing part, a plurality of strip members provided on a base for retaining the location corresponding to the upper chamber of the airbag functioning as a cover member enables achieving the merits of both the first aspect (flap) and the second aspect (housing). In other words, this enables reliable coverage of deployment area of the airbag (upper chamber) with a compact structure.

The stowing part can be secured to the rear surface or upper surface of the seat frame provided in the seatback.

The location corresponding to the upper chamber of the long rod shaped airbag is preferably folded and formed into a folded part, and the folded part is preferably stowed in the stowing part.

By folding and stowing the area corresponding to the upper chamber, deployment of this folded part is slightly delayed from that of the side chamber parts. In other words, the side chambers that are not folded deploy first, quickly restraining movement of the occupant in the lateral direction.

In addition, by folding the area corresponding to the upper chamber, sufficient amount of airbag to cover the head of the occupant can be ensured to be above the seatback enabling reliably covering the upper part of the head of the occupant above the headrest. The folded part (upper chamber) can then be deployed over the headrest to cover the upper part of the occupant's head, significantly reducing the possibility of damage to the occupant's head.

A stepped part on which the stowing part is placed can be provided on the rear surface of the seatback. Here, the stepped part can be molded by processing the cushion material that makes up the seatback.

Forming a stepped part on the rear surface of the seatback causes the stepped part to be a reaction force surface in the upward direction, and this promotes rapid deployment when the upper chamber of the airbag is deployed.

Furthermore, this enables forming of a front wall part that extends upward on the headrest side of the stepped part.

In this case, when the airbag deploys, the upper chamber deploys upward along the front wall part enabling the front wall part to assume a part of or support the cover member function.

BRIEF DESCRIPTION OF THE DRAWINGS

FIG. 1 is a perspective view primarily illustrating the external shape of the vehicle seat according to the present invention, where an airbag device is not illustrated.

FIG. 2 is a perspective view illustrating an internal structure (seat frame) functioning as a framework of the vehicle seat illustrated in FIG. 1, with an illustration of the airbag device omitted.

FIG. 3 illustrates a view of the airbag device according to the present invention installed in a vehicle seat. FIG. 3(A) illustrates a view from the side of the left side of the vehicle, and FIG. 3(B) illustrates a view from the front. Note, the vehicle seat is illustrated as see-through.

FIG. 4 illustrates the structure of an airbag employed in the airbag device according to the present invention, where FIG. 4(A) is a plan view illustrating the state in which the airbag is unfolded (state prior to being housed), while FIG. 4(B) is a front view illustrating the state in which the airbag is rolled (state when housed).

FIG. 5 illustrates the activated state (airbag deployed state) of the airbag device according to the present invention. FIG. 5(A) illustrates a view of the side from the left side of the vehicle and FIG. 5(B) illustrates a view from the front.

FIG. 6 is an explanatory diagram illustrating the folded part corresponding to the upper chamber of the airbag and illustrates the folded part as viewed from the rear surface of the seatback.

FIG. 7(A) is an explanatory diagram illustrating the structure of the storing part used in the airbag device according to embodiment 1 of the present invention. In addition, FIG. 7(B) is a schematic cross-sectional view in the direction A1-A1 of FIG. 7(A).

FIG. 8(A) is an explanatory diagram illustrating the arrangement of the airbag device according to embodiment 1 of the present invention. FIG. 8(B) and FIG. 8(C) are explanatory diagrams illustrating embodiment 1 operation.

FIG. 9(A) is an explanatory diagram illustrating the structure of the storing part used in the airbag device according to embodiment 2 of the present invention. In addition, FIG. 9(B) is a schematic cross-sectional view in the direction A2-A2 of FIG. 9(A).

FIG. 10(A) is an explanatory diagram illustrating the arrangement of the airbag device according to embodiment 2 of the present invention. FIG. 10(B) and FIG. 10(C) are explanatory diagrams illustrating embodiment 2 operation.

FIG. 11(A) is an explanatory diagram illustrating the structure of the storing part used in the airbag device according to embodiment 3 of the present invention. In addition, FIG. 11(B) is a schematic cross-sectional view in the direction A3-A3 of FIG. 11(A).

FIG. 12(A) is an explanatory diagram illustrating the arrangement of the airbag device according to embodiment 3 of the present invention. FIG. 12(B) and FIG. 12(C) are explanatory diagrams illustrating embodiment 3 operation.

FIG. 13(A), FIG. 13(B), and FIG. 13(C) are explanatory diagrams illustrating aspects where the airbag device according to the present invention is installed in a vehicle seat.

MODE FOR CARRYING OUT THE INVENTION

An airbag device and vehicle seat according to an embodiment of the present invention will be described with reference to accompanying drawings. Note, the "front" indicated in each of the diagrams is the direction an occupant is facing when seated with a normal posture and facing the direction of travel, "back" is the direction opposite of "front", "inside" is inside in the vehicle width direction (occupant side), and "outside" is outside in the vehicle width direction (door panel side).

FIG. 1 is a perspective view primarily illustrating an external shape of a vehicle seat used as the vehicle seat according to the present invention, with an illustration of an airbag device (airbag module) omitted. FIG. 2 is a perspective view illustrating an internal structure (seat frame) functioning as a framework of the vehicle seat illustrated in FIG. 1, with an illustration of the airbag device (airbag module) omitted herein as well.

As illustrated in FIG. 1 and FIG. 2, from the viewpoint of components, a vehicle seat according to this example is composed of a seat cushion 2, or a part for an occupant to sit on, a seatback 1 forming a backrest, and a headrest 3 connected to the upper end of the seatback 1. The headrest 3 is configured so as to enable height adjustment by sliding up and down.

As illustrated in FIG. 2, a seatback frame 1f forming a skeleton of the seat is provided inside the seatback 1, a pad made of a urethane foam material or the like is provided on a surface and periphery thereof, and a surface of the pad is covered with a surface skin such as leather, fabric, or the like. A seating frame 2f is provided on a bottom side of the seat cushion 2. Similar to the seatback 1, a pad made of a urethane foam material or the like is provided on an upper surface and periphery thereof, and a surface of the pad is covered by the skin such as leather, fabric, or the like. The seating frame 2f and the seatback frame 1f are connected via a reclining mechanism 4.

As illustrated in FIG. 2, the seatback frame 1f includes a frame shaped by side frames 10 arranged laterally spaced apart and extending in the vertical direction and an upper frame 8 connecting the upper ends of the side frames 10.

FIG. 3 is a side view (A) and front view (B) illustrating an airbag device according to the present invention mounted in a vehicle seat, where the vehicle seats (2, 3) are illustrated as see-through. FIG. 4 illustrates the structure of an airbag 14 employed in the airbag device according to the present invention, where FIG. 2(A) is a plan view illustrating the state in which the airbag 14 is unfolded (state prior to being stowed), while FIG. 2(B) is a front view illustrating the state in which the airbag is rolled (state when stowed). FIG. 5 illustrates the activated state (airbag 14 deployed state) of the airbag device according to the present invention. FIG. 5(A) illustrates a view of the side from the left side of the vehicle and FIG. 5(B) illustrates a view from the front.

The airbag device according to the present example is equipped in a vehicle seat having a seat cushion 2 forming a seating surface and a seatback 1 forming a backrest. The airbag device includes a pair of inflators 12a and 12b, which are stowed in the left and right side portions of the seatback 1 and generate expansion gas, and an airbag 14 stowed in the seatback 1 in a rolled or folded state that is deployed by the expansion gas discharged from the inflators 12a and 12b. Note, in the present embodiment, the seatback 1 and headrest 3 are configured separately but application to an integrated seat is also feasible.

The airbag 14 is configured to include a pair of left and right side chambers 16a and 16b that deploy from the side of the seatback 1 toward the front and restrain movement of at least the waist to the shoulders of the occupant, and an upper chamber 18 that connects the pair of side chambers 16a and 16b and is positioned above the head of the occupant when the airbag 14 is deployed. The side chambers 16a and 16b can be formed symmetrical in shape. The upper chamber 18 is positioned in the longitudinal center of the airbag 14 when in an unfolded state before stowing (FIG. 4) and is integrally molded using the same fabric as the side chambers 16a and 16b.

The upper chamber 18 of the airbag 14 is in fluid communication with the side chambers 16a and 16b, and is set up such that expansion gas discharged from the inflators 12a and 12b flows from the side chambers 16a and 16b to the upper chamber 18. The upper chamber 18 then deploys from near the upper edge of the seatback 1 above the headrest 3 and encircles the occupant's head (FIG. 5).

The airbag 14 compressed in a rolled shape is secured in the seatback 1 by first connecting members (tabs) 22a, 22b, 22c, and 22d. The first connecting members 22a, 22b, 22c, and 22d are each arranged one above and one below the inflators 12a and 12b on the left and right side portions of the seatback 1. The inflators 12a and 12b are introduced through inflator introduction parts 20a and 20b of the airbag 14.

Installing the first connecting members 22a, 22b, 22c, and 22d on the upper and lower parts of the inflators 12a and 12b enables securing the area around the inflator where the greatest pressure is generated in the initial stage of deploying the airbag 14, thereby stabilizing the deployment behavior of the airbag 14.

Note, the first connecting members can be installed in the head region, chest to abdomen region, and waist region of the occupant in the left and right side parts of the seatback 1. In this case, it is possible to restrain and protect the entire range of occupants seated in the seat.

The airbag device according to the present embodiment is further provided with second connecting members 24a and 24b in the shape of a strip with first end parts (24a1, 24b1) connected to the lower end area of the airbag 14 and second end parts (24a2, 24b2) connected to the side part of the seat cushion 2, on both the left and right sides of the seat. The second connecting members 24a and 24b can be made of the same material (cloth) as the airbag 14. Here, the first end parts (24a1, 24b1) of the second connecting members 24a and 24b are connected near the lower end part of the side chambers 16a and 16b in the deployed state thereof.

When a side collision or other event occurs, the inflators 12a and 12b release the expanding gas, causing the airbag 14 to expand and deploy. When the airbag 14 begins to expand, the gas first flows into the side chambers 16a and 16b, and then into the upper chambers 18. Herein, the side chambers 16a and 16b deploy forward from the side part of the seatback 2 and the upper chamber 18 positioned above the head of the occupant and deploys forward above the headrest.

As illustrated in FIG. 5, by configuring the airbag 14 according to the present invention to include a pair of left and right side chambers 16a and 16b that restrain movement of the occupant from the waist to the shoulders, and the upper chamber 18 that connects the pair of side chambers 16a and 16b and is located above the head of the occupant, the airbag 14 deploys in a dome shape to cover the occupant seated in the seat 2. As a result, the airbag can reliably restrain movement of the occupant at least in the left-right direction, upward, and diagonally upward, and provide suitable protection from the head to the waist of the occupant.

Also, since the configuration enables the inflation gas to flow from the side chambers 16a and 16b to the upper chamber 18, side chambers 16a and 16b deploy first and quickly restrain movement of the occupant in the lateral direction.

The upper chamber 18 deploys from near the rear edge of the upper end of the seatback 1. The upper chamber 18 deploys from near the rear edge of the upper end of the seatback 1 causing the upper chamber 18 to clear (ride over) the headrest 3 at the upper end of the seatback 1 and cover from the back of the head of the occupant toward the front. This enables avoiding direct impact of the upper chamber 18 onto the head of the occupant when the airbag 14 deploys.

In addition, by securing the airbag 14 to the seatback 1 with a plurality of first connecting members 22a, 22b, 22c, and 22d, the possibility of a gap between the seatback 1 and the airbag 14 during deployment of said airbag 14 can be reduced. As a result, for example, when an occupant comes into contact with the airbag 14 during a vehicle collision, the occupant will not protrude through the gap between the airbag 14 and the seatback 1, and the occupant can be securely restrained.

By providing second connecting members 24a and 24b in the shape of a strip that connects the lower end area of the airbag 14 to the side part of the seat cushion 2, the restraint performance near the waist area of the occupant seated in the seat (2) can be improved. In other words, when the waist, which is close to the occupant center of gravity, moves in a direction that pushes the airbag 14 down outward, the second connecting members 24a and 24b can securely hold the airbag 14 and avoid a situation where the occupant is flung out laterally.

FIG. 6 is an explanatory diagram illustrating the folded part 100 corresponding to the upper chamber 18 of the airbag 14 and illustrates the folded part 100 as viewed from the rear surface of the seatback 1.

In the present invention, a folded part 100 is formed by folding the portion corresponding to the upper chamber 18 of the long rod-shaped airbag 14, and the folded part 100 is stowed above the seatback 1. By folding and stowing in the location corresponding to the upper chamber 18 of the long rod shaped airbag 14, deployment of the folded part 100 is slightly delayed. In other words, the side chambers 16a and 16b that are not folded, deploy first, quickly restraining movement of the occupant in the lateral direction. In addition, folding of the location corresponding to the upper chamber 18 enables ensuring sufficient volume of airbag above the seatback 1 to cover the head of the occupant.

The folded part 100 (upper chamber 18) can then be deployed over the headrest 3 to cover the upper part of the occupant's head, significantly reducing the possibility of damage to the occupant's head.

As illustrated in FIG. 6, the airbag 14 compressed into the rod shape is arranged along the edge part of the seatback 1 (left edge, upper edge, and right edge) so as to reach from a first surface of the seatback 1 through the upper part and to a second surface. Here, the rod shaped airbag 14 extending from the end parts in the left-right direction of the upper part of the seatback 1 toward the center in the left-right direction is folded back and extends in the direction of the end part (outside) forming first folded parts 101L and 101R. In addition, the airbag extends from the first folded parts 101L and 101R forming second folded parts 102L and 102R facing the center near the upper end part of the seatback 1. Furthermore, the first folded parts 101L and 101R are positioned lower than the second folded parts 102L and 102R, forming an omega shape.

Note that the shape of the folded part 100 is not limited to an omega shape, and may be other shapes such as an S shape.

As illustrated in FIG. 6, when the folded part 100 is formed in an omega shape and the airbag 14 is deployed, the folded part 100 (18) deploys upward with a stronger force enabling the airbag 14 (upper chamber 18) to more readily ride over the headrest 3 and protrude forward, even if the headrest 3 is relatively large (tall).

Embodiment 1

FIG. 7(A) is an explanatory diagram illustrating the structure of a stowing part 210 used in the airbag device according to embodiment 1 of the present invention. In addition, FIG. 7(B) is a cross-sectional view in the direction A1-A1 of FIG. 7(A). FIG. 8(A) is an explanatory diagram illustrating the arrangement of the airbag device according to embodiment 1. FIG. 8(B) and FIG. 8(C) are explanatory diagrams illustrating embodiment 1 operation. Note that in FIG. 7 and FIG. 8, the cross-section of the upper chamber 18 (100) of the airbag 14 is illustrated in a simplified manner.

In the present embodiment, the stowing part in which the upper chamber 18 (folded part 100) of the airbag 14 is stowed, is a flexible flap 210 enveloping the location corresponding to the upper chamber 18. Furthermore, a first end 210a of this flap 210 is secured to the seat frame 8 and a second end 210b extends toward the upper rear surface of the headrest 3 in conjunction with deployment of the airbag 14, thus functioning as a cover member. Note that the width W1 of the flap 210 in the left-right direction (lateral direction) is set to be equal to or greater than the width of the headrest 3.

With the present embodiment, use of the flap 210 that envelops the upper chamber 18 (100) as a stowing part enables minimizing the space needed for the stowing part as well as storing the upper chamber 18 (folded part 100) in a relatively compact manner. Additionally, by changing the length of the flap 210, the range in the vertical direction (height direction) that can be covered by the cover member can be easily adjusted.

In FIG. 8, from a non-activated state (A), as the airbag device starts to activate, the airbag 14 expands and the upper chamber 18 starts to deploy. As illustrated in FIG. 8(B), a free end 210b of the flap 210 opens based on the deployment pressure of the upper chamber 18. The free end 210b of the flap 210 that has opened extends toward the upper rear surface of the headrest 3 and contacts the rear surface of the headrest 3. Thereafter, upon full deployment of the airbag 14, as illustrated in FIG. 8(C), the upper chamber 18 deploys along the flap 210 that functions as a cover member deploying above the head of the occupant over the headrest 3 (see FIG. 5 as well).

Note that in FIG. 8, the side chambers 16a and 16b are not illustrated but deployment of the side chambers 16a and 16b starts slightly before deployment of the upper chamber 18.

Embodiment 2

FIG. 9(A) is an explanatory diagram illustrating the structure of a stowing part 220 used in the airbag device according to embodiment 2 of the present invention. In addition, FIG. 9(B) is a cross-sectional view in the direction A2-A2 of FIG. 9(A). FIG. 10(A) is an explanatory diagram illustrating the arrangement of the airbag device according to embodiment 2. FIG. 10(B) and FIG. 10(C) are explanatory diagrams illustrating embodiment 2 operation. Note that in FIG. 9 and FIG. 10, the cross-section of the upper chamber 18 (100) of the airbag 14 is illustrated in a simplified manner.

In the present embodiment, the stowing part 220 where the upper chamber 18 (folded part 100) of the airbag 14 is stowed includes a rigid housing 222 made of metal or plastic and the housing 222 is configured so as to be secured to the seat frame 8 arranged in the seatback 1. The upper part of the housing 222 is provided with a lid 220a that can be opened and closed using a hinge 220b. When the airbag 14 is deployed, this lid 220a opens and functions as a cover member. Note, the width W2 in the left-right direction (lateral direction) of the lid 220a can be set to be equal to or greater than the width of the headrest 3.

With the present embodiment, using the rigid housing 222 as a stowing part causes the lid 220a to function as a cover member and this enables effectively mitigating the impact of the upper chamber 18 on the rear surface of the headrest 3 when the airbag 14 deploys. In addition, configuring of the cover member with a simple operation of opening and closing of the lid 220a more reliably enables the function of the cover member.

In FIG. 10, from a non-activated state (A), as the airbag device starts to activate, the airbag 14 expands and the upper chamber 18 starts to deploy. As illustrated in FIG. 8(B), the lid 220a of the housing opens based on the deployment pressure of the upper chamber 18. Pressure is applied on the opened lid 220a. Thereafter, upon full deployment of the airbag 14, as illustrated in FIG. 8(C), the upper chamber 18 deploys along the lid 220a that functions as a cover member deploying above the head of the occupant over the headrest 3 (see FIG. 5).

Note that in FIG. 10, the side chambers 16a and 16b are not illustrated but deployment of the side chambers 16a and 16b starts slightly before deployment of the upper chamber 18.

Embodiment 3

FIG. 11(A) is an explanatory diagram illustrating the structure of a stowing part 230 used in the airbag device according to embodiment 3 of the present invention. In addition, FIG. 11(B) is a cross-sectional view in the direction A3-A3 of FIG. 11(A). FIG. 12(A) is an explanatory diagram illustrating the arrangement of the airbag device according to embodiment 3. FIG. 12(B) and FIG. 12(C) are explanatory diagrams illustrating embodiment 3 operation. Note that in FIG. 11 and FIG. 12, the cross-section of the upper chamber 18 (100) of the airbag 14 is illustrated in a simplified manner.

In the present embodiment, the stowing part 230, in which the upper chamber 18 (folded part 100) of the airbag 14 is stowed, is provided with a base part 232 having a recessed part (groove or the like) 232a that is able to retain the upper chamber 18 (folded part 100) and the base part 232 is secured to the seat frame 8 arranged in the seatback 1.

The base part 232 is provided with three flexible strip members 234a, 234b, and 234c that cover over the location (folded part 100) corresponding to the upper chamber 18 of the airbag 14. A first end of the strip members 234a, 234b, and 234c is secured to the base part 232 and a second end has hooks 238a, 238b, and 238c formed to engage with slits 236a, 236b, and 236c formed on the base part 232. Furthermore, when the airbag 14 is deployed, the hooks 238a, 238b, and 238c of the strip members 234a, 234b, and 234c disengage causing the strip members 234a, 234b, and 234c to function as cover members. Note, the overall width W3 of the three strip members 234a, 234b, and 234c can be set to be equal or greater than the width of the headrest 3.

In the present embodiment, the base part 232 for retaining the location (folded part 100) corresponding to the upper chamber 18 of the airbag 14 being used as the stowing part 230 causes the plurality of strip members 234a, 234b, and 234c provided thereabove to function as cover members, thereby achieving the merits of both the first aspect (flap) and the second aspect (housing). In other words, this enables reliable coverage of deployment area of the airbag 14 (upper chamber 18) with a compact structure.

In FIG. 12, from a non-activated state (A), as the airbag 14 starts to activate, the upper chamber 18 starts to deploy and as illustrated in FIG. 12(B), the hooks 238 of the strip member 234 (234a, 234b, 234c) disengage from the slit 236 due to deployment pressure of the upper chamber 18. Thereafter, as the airbag 14 fully deploys, as illustrated in FIG. 12(C), the upper chamber 18 deploys along the strip member 234 as a cover member, deploying above the head of the occupant over the headrest 3 (see FIG. 5).

Note that in FIG. 12, side chambers 16a and 16b are not illustrated but deployment of the side chambers 16a and 16b starts slightly before deployment of the upper chamber 18.

FIG. 13(A), FIG. 13(B), and FIG. 13(C) are explanatory diagrams illustrating aspects where the airbag device (stowing part) according to the present invention is installed in a vehicle seat. In the present invention, as shown in FIG. 13(A), the stowing parts 210, 220, and 230 are placed and secured at the upper part of the seat frame 8, or in other words, as shown in FIG. 13(B), can be secured to the rear surface of the seat frame 8.

Furthermore, as illustrated in FIG. 13(C), a stepped part 300 for placing the stowing parts 210, 220, and 230 can be provided on the rear surface of the seatback 1. Here, the stepped part 300 can be molded by processing the cushion material that makes up the seatback 1. Forming the stepped part 300 on the rear surface of the seatback 1 in this manner causes the stepped part 300 to be an upper direction reaction force surface when the upper chamber 18 of the airbag 14 is deployed enabling promoting quick deployment.

In addition, a front wall part 302 that extends upwards can be formed on the headrest 3 side of the stepped part 300. In this case, when the airbag 14 deploys, the upper chamber 18 deploys upward along the front wall part 302 enabling the front wall part 302 to support (assume a part of) the cover member function.

The present invention has been described with reference to embodiments; however, the present invention is not limited to the embodiments described above. In other words, changes can be made as necessary without deviating from the scope of the technical concept of the invention.

The invention claimed is:

1. An airbag device equipped in a vehicle seat having a seat cushion forming a seat surface, a seatback forming a backrest, and a headrest arranged at an upper part of the seatback, the airbag device comprising:
   an inflator for generating inflation gas;
   an airbag stowed at least within the seatback that expands based on expansion gas discharged from the inflator, the airbag includes a pair of left and right side chambers configured to deploy from side parts of the seatback forward and an upper chamber that is provided continuously with the side chambers and configured to deploy above the head of an occupant,
   a portion of the airbag corresponding to the upper chamber is stowed in a stowing part provided above the seatback on a rear surface of the headrest; and
   a cover member disposed between the airbag and the seatback, the cover member configured to deploy toward the rear surface of the headrest in conjunction with deployment of the airbag,
   wherein the cover member extends completely around the airbag prior to deployment of the airbag.

2. The airbag device according to claim 1, wherein an upper end of the cover member and the airbag are deployable over at least a portion of a top of the headrest.

3. The airbag device according to claim 1, wherein a lateral width of the cover member is equal to or greater than a width of the headrest.

4. The airbag device according to claim 1, wherein the cover member is a flexible flap that envelops the portion of the airbag corresponding to the upper chamber of the airbag, and
   a first end of the flexible flap is secured and a second end extends towards the upper part of the rear surface of the headrest in conjunction with deployment of the airbag.

5. The airbag device according to claim 1, wherein the stowing part includes a base part with a recessed part for retaining the portion corresponding to the upper chamber of the airbag, and
   the base part is secured to a seat frame arranged in the seatback.

6. The airbag device according to claim 5, wherein the base part is provided with a plurality of strip members that cover the upper part of a location corresponding to the upper chamber of the airbag,
   a first end of the strip members is secured to the base part and a second end engages with the base part by means of a hook, and
   upon deployment of the airbag, the hook of the strip members disengage and the strip members function as the cover member.

7. The airbag device according to claim 1, wherein the portion corresponding to the upper chamber of the airbag is folded and formed into a folded part, and
   the folded part is stowed in the stowing part.

8. A vehicle seat comprising the airbag device described in claim 1.

9. The vehicle seat according to claim 8, wherein a stepped part is provided in the rear surface of the seatback for placing the stowing part.

10. The vehicle seat according to claim 9, wherein the stepped part is molded by processing a cushion material that makes up the seatback.

11. The vehicle seat according to claim 9, wherein a front wall part extending upward is formed on a headrest side of the stepped part.

12. The vehicle seat according to claim 11, wherein the cover member reaches above the front wall part when the airbag is deployed.

13. The airbag device according to claim 1, wherein the airbag is configured to deploy up and over a top of the headrest and the cover member is deployable between the airbag and a rear side of the headrest.

14. The airbag device according to claim 1, wherein a first end of the cover member is securable to a frame of the vehicle seat and a second end of the cover member is deployable toward an upper rear surface of the headrest in conjunction with deployment of the airbag.

15. The airbag device according to claim 1, the portion of the airbag corresponding to the upper chamber is in a long rod shape in a direction intersecting a longitudinal direction prior to deployment.

16. An airbag device equipped in a vehicle seat having a seat cushion forming a seat surface, a seatback forming a backrest, and a headrest arranged at an upper part of the seatback, the airbag device comprising:
   an inflator for generating inflation gas;
   an airbag stowed at least within the seatback that expands based on expansion gas discharged from the inflator, the airbag includes a pair of left and right side chambers configured to deploy from side parts of the seatback forward and an upper chamber provided continuously with the side chambers and configured to deploy above the head of an occupant, a portion of the airbag corresponding to the upper chamber is stowed in a stowing part provided above the seatback on a rear surface of the headrest;
   and a cover member disposed between the airbag and the seatback, the cover member configured to deploy toward the rear surface of the headrest in conjunction with deployment of the airbag,
   wherein the airbag is configured to deploy up and over a top of the headrest and the cover member is deployable between the airbag and a rear side of the headrest
   wherein the cover member extends around at least 3 sides of the airbag prior to deployment of the airbag.

17. A vehicle seat comprising the airbag device described in claim 16.

18. An airbag device equipped in a vehicle seat having a seat cushion forming a seat surface, a seatback forming a backrest, and a headrest arranged at an upper part of the seatback, the airbag device comprising:
   an inflator for generating inflation gas;
   an airbag stowed at least within the seatback that expands based on expansion gas discharged from the inflator, the airbag includes a pair of left and right side chambers configured to deploy from side parts of the seatback forward and an upper chamber provided continuously with the side chambers and configured to deploy above the head of an occupant, a portion of the airbag corresponding to the upper chamber is stowed in a stowing part provided above the seatback on a rear surface of the headrest; and
   a cover member disposed between the airbag and the seatback, the cover member configured to deploy toward the rear surface of the headrest in conjunction with deployment of the airbag, wherein the cover member includes a first portion extending over the airbag and a second portion extending along a rear side of the airbag prior to deployment of the airbag
wherein the cover member extends around at least 3 sides of the airbag prior to deployment of the airbag.

19. A vehicle seat comprising the airbag device described in claim 17.

* * * * *